United States Patent [19]

Wasserman et al.

[11] 4,042,441

[45] Aug. 16, 1977

[54] MECHANICAL-CHEMICAL LINKAGE BETWEEN POLYMER LAYERS

[75] Inventors: Bernard Wasserman, Ridgecrest; Martin H. Kaufman, China Lake, both of Calif.

[73] Assignee: The United States of America as represented by the Secretary of the Navy, Washington, D.C.

[21] Appl. No.: 683,996

[22] Filed: May 6, 1976

[51] Int. Cl.[2] .......... C09J 5/00

[52] U.S. Cl. .......... 156/306; 86/1 R; 102/103; 156/329; 260/825; 260/827; 264/3 R; 427/387; 427/400; 428/420; 428/447

[58] Field of Search .......... 156/294, 315, 306, 328, 156/309; 427/387, 409, 400; 428/420, 448, 423, 450, 447, 451; 260/825, 827; 102/103; 264/3 R; 86/1 R; 60/39.47, 255

[56] References Cited

U.S. PATENT DOCUMENTS

| | | | |
|---|---|---|---|
| 2,823,218 | 2/1958 | Speier et al. | 260/827 |
| 2,924,587 | 2/1960 | Shorr | 428/423 |
| 3,054,253 | 9/1962 | Chung | 102/103 |
| 3,505,279 | 4/1970 | Preston et al. | 260/827 |
| 3,507,114 | 4/1970 | Webb | 102/103 |
| 3,519,465 | 7/1970 | Lyles | 428/447 |
| 3,686,355 | 8/1972 | Gaines et al. | 260/825 |
| 3,694,416 | 9/1972 | Rubens et al. | 428/423 |
| 3,716,604 | 2/1973 | Behm | 102/103 |
| 3,725,174 | 4/1973 | Gaylord | 156/308 |
| 3,813,308 | 5/1974 | Skidmore | 149/109 |
| 3,961,476 | 6/1976 | Wasserman et al. | 102/103 |

OTHER PUBLICATIONS

Gaines et al, "Surface Concentration of Styrene-dimethylsiloxane Block Copolymer to Mixtures with Polystyrene," *Macromolecules* vol. 5, p. 82, Jan. 2, 1972.

*Primary Examiner*—Charles E. Van Horn
*Assistant Examiner*—J. J. Gallagher
*Attorney, Agent, or Firm*—R. S. Sciascia; Roy Miller; David J. Aston

[57] ABSTRACT

An elastomeric or rigid polymeric material, such as a propellant, is strongly bonded to an incompatible material, such as a silicon rubber liner, when a long chain polymer which is insoluble in and unreactive with the liner but has groups reactive with the propellant is added to the liquid or uncured liner. As the liner cures, the polymer chain migrates to the surface. Upon laying the propellant on the surface and curing the propellant, the propellant is cross-linked to the long chain polymer, which is entangled in the rubber liner.

6 Claims, No Drawings

MECHANICAL-CHEMICAL LINKAGE BETWEEN POLYMER LAYERS

CROSS REFERENCE TO RELATED APPLICATION

U.S. patent application Ser. No. 637,507, "Process for Bonding Polymers" by Bernard Wasserman and Martin H. Kaufman filed Dec. 4, 1975.

BACKGROUND OF THE INVENTION

The present invention relates to the bonding of two dissimilar polymeric materials, and more particularly to the bonding of a solid rocket propellant to a silicone rubber liner.

Silicone rubber, as used in this specification, encompasses two major product types, heat cured rubber and room temperature vulcanizing rubber, (RTV), whose compositions and properties are well known to those skilled in the art.

It is often difficult to get one layer of polymeric material to bond to another, especally where the chemical natures of the two layers are very different. The layers may have different surface energies, they may not wet each other well, or there may be steric hindrance between the molecules of the two layers.

This bonding problem has been found to be especially acute in applications of silicone rubber. In fact, silicone rubber is often used as a mold for casting plastics because of its inertness and quick release characteristics toward most plastics, e.g., vinyl plastisols, epoxies, polyester resins, and polyurethanes.

The bonding problem occurs in the field of rocketry because silicone rubber is used as a liner between the metal casing of the rocket and the solid propellant fuel grain. It insulates the casing from the propellant grain both thermally and mechanically. The overall performance characteristics of the rocket are highly dependent on the strength of the bond between the propellant, the liner, and the casing.

It is known in rocket technology to chemically crosslink the liner to the propellant grain. Webb, in U.S. Pat. No. 3,507,114, and Skidmore in U.S. Pat. No. 3,813,308 both describe such chemical bonding techniques. Webb describes the bonding of a polybutadiene propellant to a HTPB (hydroxy terminated polybutadiene) liner by adding to the liner an excess of diisocyanate crosslinking agent. Skidmore describes the bonding of a carboxy-containing rubber liner, such as butadiene, to a rubber insulator, preferably styrene butadiene, by coating the surface of the insulator with a polyisocyanate, preferably a di- or tri- isocyanate, thereby crosslinking the liner to the insulator.

Due to the above-mentioned incompatability of silicone rubber with butadiene rubber etc., bonding techniques such as Webb's and Skidmore's cannot be used with silicone rubber liners.

SUMMARY OF THE INVENTION

A polymeric rubber liner is bound to a layer of an incompatible rigid or elastomeric polymer by the addition to the rubber while in the uncured state, of a long chain polymer which is (1) non-reactive with the rubber; (2) insoluble in the rubber; and (3) capable of forming crosslinks with the incompatible layer. The long chain polymer is allowed to migrate to the surface of the rubber, to which it is held by mechanical linkages of the polymer chains. The rubber is cured and the incompatible polymer is layed down on the rubber and cured. The long chain polymer in the rubber crosslinks with the incompatible polymer thereby forming a strong bond between the two materials.

This process has particular applicability to the bonding of a silicone rubber rocket liner to a solid polymeric propellant. A propellant of hydroxy terminated polybutadiene and isophorone diisocyanate can be bound to the liner by the addition of a dimethyl silicone-butadiene copolymer to the liner.

DESCRIPTION OF THE PREFERRED EMBODIMENT

This invention, as presently contemplated, involves the bonding of a silicone rubber liner to a solid rocket propellant. It should be understood, however, that any two dissimilar polymers may be bonded using this technique with the proper selection of the long chain additives as determined by knowledge of the materials involved and no more than routine experimentation.

The silicone rubber used in the experiments leading to the present invention had a siloxane structure with 70% methyl and 30% phenyl groups attached to the silicone atoms. It is similar to the commonly used polydimethylsiloxane. A molecule of this polymer in the uncured state is like a string many atoms long with little or no branching.

The propellant used in the experiments comprised a binder of HTPB and isophorone diisocyanate, but other solid propellants having other polymeric binder-fuels could be employed. The unusual surface properties of silicone rubber render this binder and any other polymeric hydrocarbon layer incompatible. The term "polymeric hydrocarbon" is used to generally designate polymers with a backbone other than silicon-oxygen.

A block copolymer of HTPB and dimethyl siloxane was used as the insoluble long chain polymer. Repeating monomer units from each of the two layers to be bonded form a long chain polymer which is predictably insoluble in one layer yet crosslinkable with the other. The hydroxy groups in the butadiene are unreactive with the silicone rubber, but crosslink with isocyanate in the propellant.

Of course, other long chain polymers could be used in other systems. The long chain polymer should be less dense than and nonreactive with the liquid in which it is mixed. It will rise to the surface on its own. Surface migration may be aided by centrifuging the mixture.

Examples of long chain polymers which migrate to the surface of polymeric liquids for convenience herein termed "solvents" are long chain amides in polyethylene or vinylidene chloride-acrylonitrile copolymer and styrene-dimethyl siloxane block copolymers in polystyrene. See *Macromolecules,* Vol. 5, p. 82, Jan.-Feb. 1972.

Migration is thought to be at least partly a function of the polarity of the two mixed compounds. The groups on the chain polymer which are intended to react with the later added layer should be chosen so as to extend from the solvent. For instance, if the solvent is polar, they should be non-polar.

Migration to the surface is, of course, influenced by the thickness of the solvent layer. Layers around 1cm thick have been used. A thick layer of solvent could be laid down, hardened, and a thinner, long chain-containing solvent layer could be laid on it. The hardened solvent, whether silicone rubber, polyethylene, polystyrene, or the like is, for convenience, termed generally the "rubber".

The following examples illustrate the practice of the present invention.

EXAMPLE 1

A hydroxy terminated dimethyl silicone with average molecular weight of 2100 and hydroxy percentage of 1.0–1.5 was heated at 70° C in vacuo for 48 hours with a small amount of dibutyltin dilaurate. Two parts of the resultant product were heated at 75° C for 24 hours with one part of a hydroxy terminated polybutadiene prepolymer (Arco R-45M). The product was homogeneous. 5.4 weight percent of this product and 94.6 weight percent uncured silicone rubber prepolymer were mixed and cured by conventional methods. Next, a propellant whose binder was a mixture of hydroxy terminated polybutadiene and isophorone diisocyanate containing a ratio of isocyanate equivalents to hydroxy equivalents of 0.8 was prepared, laid down in a layer on the silicone rubber layer and allowed to cure. Tests showed that a force of 303000 Pa (44psi) was required to pull the two layers apart. A similarly prepared blank which contained no additive separated when 68900 Pa (10 psi) of force was applied.

EXAMPLE 2

A hydroxy terminated dimethyl silicone with averge molecular weight of 2100 and hydroxy percentage of 1.0–1.5 was heated at 70° C in vacuo for 48 hours with a small amount of dibutyltin dilaurate. One part of the resultant product was heated at 75° C for 24 hours with two parts of a hydroxy terminated polybutadiene prepolymer (Arco R-45M). The product was homogeneous. 5.1 weight percent of this product and 94.9 weight percent uncured silicone rubber prepolymer were mixed and cured by conventional methods. Next, a propellant whose binder was a mixture of hydroxy terminated polybutadiene and isophorone diisocyanate containing a ratio of isocyanate equivalents to hydroxy equivalents of 0.8 was prepared, laid down in a layer on the silicone rubber layer and allowed to cure. Tests showed that a force of 283000 Pa (41 psi) was required to pull the two layers apart. A similarly prepared blank which contained no additive separted when 68900 Pa (10 psi) of force was applied.

What is claimed is:

1. A method of bonding a polymeric hydrocarbon to an incompatible rubber comprising the steps of:

forming a long chain polymer containing at least one group insoluble in and non-reactive with said rubber but reactive with said polymeric hydrocarbon;

forming a mixture of said long chain polymer and said rubber while the rubber is uncured;

allowing said long chain polymer to migrate to a surface of said rubber; curing said rubber; and placing said polymeric hydrocarbon on said surface of the mixture, thereby reacting the reactive with the polymeric hydrocarbon and thereby bonding the rubber to the polymeric hydrocarbon; and curing said polymeric hydrocarbon on said incompatible rubber.

2. The process of claim 1 wherein said rubber is silicone rubber.

3. The process of claim 1 wherein said long chain polymer is a copolymer of monomer units present in said polymeric hydrocarbon and different monomer units present in said rubber.

4. The process of claim 1 wherein said polymeric hydrocarbon is a solid propellant.

5. The process of claim 4 wherein said propellant comprises a binder of polybutadiene and isophorone diisocyanate.

6. The process of claim 5 wherein said rubber is silicone rubber and said long chain polymer is a block copolymer of poly (dimethyl silicone) and polybutadiene.

* * * * *